(12) United States Patent
Jackson

(10) Patent No.: US 8,798,644 B2
(45) Date of Patent: Aug. 5, 2014

(54) SYSTEMS AND METHODS FOR DETERMINING THE LOCATION OF MOBILE DEVICES INDEPENDENT OF LOCATION FIXING HARDWARE

(75) Inventor: Bruce K. Jackson, Bournemouth (GB)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 12/651,004

(22) Filed: Dec. 31, 2009

(65) Prior Publication Data

US 2011/0159862 A1 Jun. 30, 2011

(51) Int. Cl.
*H04W 24/00* (2009.01)

(52) U.S. Cl.
USPC ............... 455/456.2; 455/456.1; 455/456.5; 455/456.6; 455/404.2; 370/406

(58) Field of Classification Search
USPC ............ 455/404.2, 456.1–457; 340/539.13, 340/988–996; D10/104.2; 370/389, 400, 370/406
See application file for complete search history.

(56) References Cited

U.S. PATENT DOCUMENTS

| | | | | |
|---|---|---|---|---|
| 6,778,818 B1 * | 8/2004 | O'Neil | ........................ | 455/404.1 |
| 7,536,188 B1 * | 5/2009 | Fegan et al. | ................ | 455/456.1 |
| 7,595,754 B2 | 9/2009 | Mehta | | |
| 2004/0116072 A1 * | 6/2004 | Lobo | ............................ | 455/41.2 |
| 2005/0277427 A1 | 12/2005 | Zhang | | |
| 2007/0135134 A1 | 6/2007 | Patrick | | |
| 2007/0150516 A1 | 6/2007 | Morgan et al. | | |
| 2007/0202888 A1 | 8/2007 | Brachet et al. | | |
| 2007/0275730 A1 | 11/2007 | Bienas et al. | | |
| 2010/0039315 A1 * | 2/2010 | Malkos et al. | ............. | 342/357.1 |

FOREIGN PATENT DOCUMENTS

| | | | |
|---|---|---|---|
| ES | 2326774 A1 | 10/2009 | |
| JP | 2004221991 A | 8/2004 | |
| JP | 2006013670 A | 1/2006 | |
| JP | 2009529159 A | 8/2009 | |
| WO | WO-2007062192 A2 | 5/2007 | |
| WO | WO-2009082728 A2 | 7/2009 | |

OTHER PUBLICATIONS

International Search Report and Written Opinion—PCT/US2010/061990, International Search Authority—European Patent Office—Apr. 1, 2011.

* cited by examiner

*Primary Examiner* — Ronald Eisner
(74) *Attorney, Agent, or Firm* — Fariba Yadegar-Bandari

(57) ABSTRACT

Implementations relate to systems and methods for determining a location of a mobile device. The mobile device can query other mobile devices within service range for identification information, and send the identification information to a remote server for storage therein. The remote server can receive location information from other mobile devices corresponding to the identification information. The mobile device can send a location query to the remote server, which can determine or calculate a location of the mobile device based on the identification and/or location information of the other mobile devices. The remote server can provide the location of the mobile device to the mobile device for use in associated mobile applications.

50 Claims, 6 Drawing Sheets

SYSTEMS AND METHODS FOR DETERMINING THE LOCATION OF MOBILE DEVICES INDEPENDENT OF LOCATION FIXING HARDWARE

BACKGROUND

The present teachings relate generally to methods and apparatus for determining the location of a mobile device, and more particularly to platforms and techniques for providing location services to mobile devices independent of location fixing hardware present in the mobile devices.

Cellular telephone technology has become the predominate mode of communication in today's society. Cellular telephones have advanced to a point to include a wide variety of features for the cellular telephone user. One such feature is location fixing for the cellular telephones. Currently, many types of cellular telephones include location fixing hardware, such as Global Positioning System (GPS). As a consequence, the cost of cellular telephones has risen due to the inclusion of the advance features. The cellular telephones are required to be manufactured to include hardware, such as GPS receivers and software, to support the location fixing.

Additionally, cellular telephones may be limited in their ability to determine the location. For example, GPS enabled telephones are required to have an unobstructed view of the sky in order to receive the GPS signal. As such, GPS enabled telephones often will not be able to fix a location of the telephone if in-doors or blocked by trees. Accordingly, method and systems are needed that provide cost effective and flexible location services for mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one or more implementations, a system for enabling location services includes a server. The server can be configured to maintain a record of location information for a set of mobile devices. The location information for each mobile device is associated with an identification of each mobile device. The server can be configured to receive a request for a location from a mobile device. The request includes a set of identifications for other mobile devices within proximity of the mobile device. The server can be configured to determine the location of the mobile device utilizing available location information, from the record, associated with the received set of identifications, and configured to provide the determined location to the mobile device.

Additionally, according to one or more implementations, a method for enabling location services can include maintaining a record of location information for a set of mobile devices. The location information for each mobile device is associated with an identification of each mobile device. The method can further include receiving a request for a location from a mobile device. The request includes a set of identifications for other mobile devices within proximity of the mobile device. The method can further include determining the location of the mobile device utilizing available location information, from the record, associated with the received set of identifications, and providing the determined location to the mobile device.

Further, according to one or more implementations, a system for enabling location services can include means for maintaining a record of location information for a set of mobile devices. The location information for each mobile device is associated with an identification of each mobile device. The system can also include means for receiving a request for a location from a mobile device and providing the location to the mobile device. The request includes a set of identifications for other mobile devices within proximity of the mobile device. The system can also include means for determining the location of the mobile device utilizing available location information, from the record, associated with the received set of identifications.

Additionally, according to one or more implementations, a computer program product can include a computer-readable medium storing instructions that causes a computer to perform location services when executed by the computer. The instructions can include at least one instruction for causing the computer to maintain a record of location information for a set of mobile devices. The location information for each mobile device is associated with an identification of each mobile device. The instructions can further include at least one instruction for causing the computer to receive a request for a location from a mobile device. The request including a set of identifications for other mobile devices within proximity of the mobile device. The instructions can further include at least one instruction for causing the computer to determine the location of the mobile device utilizing available location information, from the record, associated the received set of identifications and at least one instruction for causing the computer to provide the determined location to the mobile device.

Further, according to one or more implementations, a mobile device can include a wireless interface to a server, a self-configuring wireless network interface, and a processor communicating with the wireless interface and the self configuring wireless network interface. The processor can be configured to initiate processing including identifying, via the self-configuring wireless network interface, a set of other mobile devices within proximity of the mobile device. The processor can also be configured to initiate processing including requesting, from the server via the wireless interface, a location of the mobile device based on identifications of the set of other mobile devices. The processor can be configured to initiate processing including receiving, from the server via the wireless interface, the location of the mobile device.

Additionally, according to one or more implementations, a method of determining location in a mobile device independent of location fixing hardware can include identifying a set of other mobile devices within proximity of the mobile device. The method can further include requesting, from a server, a location of the mobile device based on identifications of the set of other mobile devices and receiving, from the server, the location of the mobile device.

Further, according to one or more implementations, a system for enabling location services can include means for maintaining a record of location information for a set of mobile devices. The location information for each mobile device is associated with an identification of each mobile device. The system can further include means for receiving a request for a location from a mobile device and providing the location to the mobile device. The request includes a set of identifications for other mobile devices within proximity of the mobile device. The system can further include means for determining the location utilizing available location information, from the record, associated the received set of identifications.

Additionally, according to one or more implementations, a computer program product can include a computer-readable medium storing instructions that causes a mobile device to determine location independent of location fixing hardware when executed by the mobile device. The instructions can include at least one instruction for causing the mobile device to identify a set of other mobile devices within proximity of the mobile device. The instructions can also include at least one instruction for causing the mobile device to request, from a server, a location of the mobile device based on identifications of the set of other mobile devices. The instructions can also include at least one instruction for causing the mobile device to receive, from the server, the location of the mobile device.

DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Figure 1:
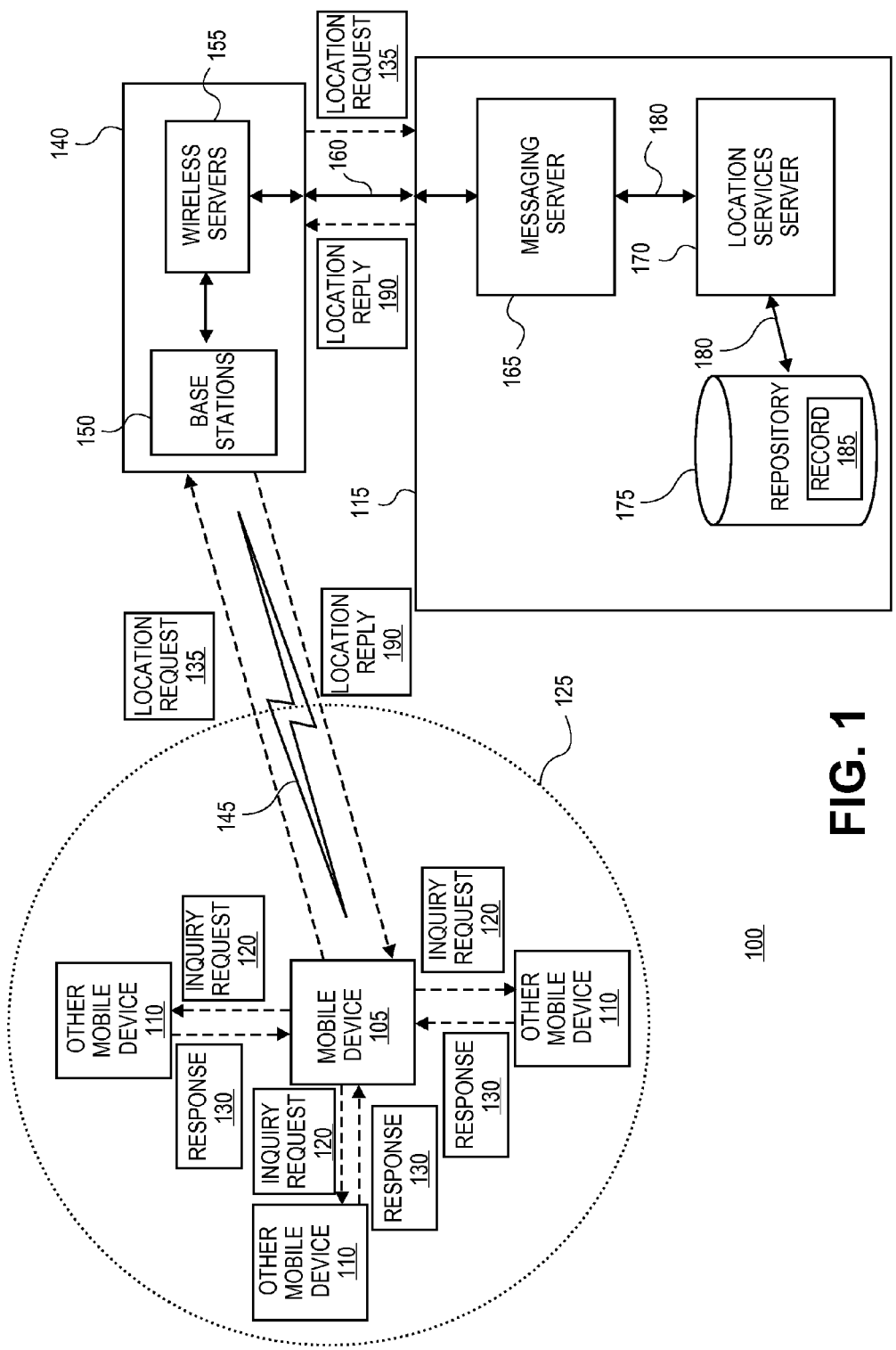
FIG. 1 illustrates a location services system that includes one or more mobile devices and a remote server in a back-end of the location services system, consistent with one or more aspects of the present teachings.

Reference will now be made in detail to implementations of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which may be practiced. These implementations are described in sufficient detail to enable those skilled in the art to practice these implementations and it is to be understood that other implementations may be utilized and that changes may be made without departing from the scope of the present teachings. The following description is, therefore, merely exemplary.

One or more aspects of the present teachings relate to systems and methods for providing location services to a mobile device that may lack location fixing hardware. More particularly, a mobile device can be configured to identify other mobile devices within proximity of the mobile device and request a location from a remote server. The mobile device can be configured to search for the other mobile devices via a self configuring network interface, for example, a Bluetooth® network interface. Once identified, the mobile device can be configured to transmit identification information, obtained in the search, of the other mobile devices to the remote server via a wireless interface. For example, the identification information can be a network interface identifier, such as a Bluetooth® device identifier, of the other mobile devices. The remote server can be configured to maintain a record of location information of the other mobile devices, which are enabled with location detection resources, associated with the identification information, e.g. the network interface identifiers, of the other location-enabled mobile devices. In response to receiving identification information from the mobile device, the remote server can be configured to retrieve available location information associated with the identification information transmitted by the mobile device and determine a location for the mobile device based on available location information of the other mobile devices. The remote server can be configured to transmit the determined location to the mobile device via the wireless interface.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Additionally, various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

In one or more aspects, and as for example generally shown in FIG. 1, a system 100 can provide location services to a mobile device 105 that may not include location fixing hardware. According to one or more implementations, as generally shown in FIG. 1, during the usage of mobile device 105, the location of mobile device 105 can be determined. For example, the user of mobile device 105 can desire to know the location of mobile device 105 by, for example, using one or more applications (e.g., mapping applications) executing on mobile device 105. To achieve this, the mobile device 105 can determine the location of the mobile device 105 by communicating with other mobile devices 110 within proximity of the mobile device 105 and communicating with a remote server 115 to determine the location of the mobile device 105 based on location information of one or more of other mobile devices 110 maintained by the remote server 115.

According to one or more implementations, the mobile device 105 can be configured to identify other mobile devices 110 within proximity of the mobile device 105. The mobile device 105 can be configured to search for other mobile devices 110 via a self-configuring network interface. For example, the mobile device 105 and one or more of other mobile devices 110 can be configured to communicate via a self-configuring network interface, such as a Bluetooth® network interface. The mobile device 105 can be configured to broadcast an inquiry request 120 to any other mobile devices 110 within a range 125 of the self-configuring network signal. The inquiry request 120 can be configured to request or initiate a response from other mobile devices 110. In response, the other mobile devices 110, which contain a self-configuring network interface, can be configured to transmit a response 130 to the inquiry request 120. The response 130 can be configured to include information that identifies other mobile devices 110. For example, each of other mobile devices 110, which contain the self-configuring network interface, can respond with the network interface identifiers, such as a Bluetooth® device identifier, of its particular self-configuring network interface.

According to one or more implementations, the mobile device 105 and the other mobile devices 110 can be any type mobile and/or portable electronic device. Examples of the mobile device 105 and the other mobile devices 110 can include a cellular telephone ("cell phone"), a personal digital assistant (PDA), smart cellular telephones ("smart phones"), laptop computers, tablet computers, digital media devices, GPS devices, and the like. To communicate, the mobile device 105 and one or more of other mobile devices 110 can be configured to include the necessary hardware, software, and combinations thereof to communicate via a self-configuring network interface. For example, the mobile device 105 and one or more of other mobile devices 110 can be configured to include Bluetooth® hardware, software, and combinations thereof.

According to one or more implementations, one or more of other mobile devices 110 can include the capability to detect the location, position, orientation, movement, and the like, of the other mobile devices 110. The detection of the location or position of other mobile devices 110, for example, can be performed using various positioning services, such as the Global Positioning System (GPS), Assisted GPS (A-GPS), base-station triangulation or Trilateration based on cellular telephone base station triangulations or Trilateration to a registered cellular telephone, the European Galileo position system, or other positioning or location services or techniques. The detection and identification of the location of the other mobile devices 110, for example, can be performed using various hardware, software, and combination thereof, for example, a GPS unit, an accelerometer, a gyroscope, and/or other orientation and movement detection services or techniques incorporated in the other mobile devices 110.

According to one or more implementations, in terms of integration in mobile device 105 and other mobile devices 110, communication via the self-configuring network and location detection can be performed or enhanced using BREW® API available from Qualcomm Incorporated of San Diego, Calif. Other communication and location detection APIs or services can be used to integrate communication and location detection in the mobile device 105 and the other mobile devices 110, such as APIs and services that are executable under Java Platform, Micro Edition (Java ME™) from Sun Microsystems, Symbian™ OS from Symbian Ltd., Flash Lite™ from Adobe Systems, Windows Mobile™ from Microsoft Corporation, iPhone™ OS from Apple Inc., Android™ from Open Handset Alliance, or the like.

According to one or more implementations, once identified, the mobile device 105 can be configured to transmit a location request 135 to the remote server 115. The location request 135 can be configured to request a location for the mobile device 105 based on the other mobile devices 110 that are within proximity of the mobile device 105. The location request 135 can include the information that identifies the other mobile devices 110 within proximity of mobile device 105. For example, mobile device 105 can be configured to transmit the network interface identifiers, such as the Bluetooth® device identifiers, to the remote server 115 in the location request 135.

According to one or more implementations, as shown in FIG. 1, the mobile device 105 can be configured to communicate with the remote server 115 via a wireless interface. For example, in one or more implementations, the mobile device 105 can communicate with a wireless services provider 140 via a wireless connection 145 and one or more base stations 150 supported by one or more wireless servers 155 operating within the system 100. The wireless services provider 140 can in turn communicate with a set of resources including, for example, a user database storing user-related subscription, configuration, positioning, and other information (not shown). The wireless connection 145 can be configured according to any type of wireless protocol or standard compatible with the mobile device 105 and the wireless services provider 140, for example, any version of a Global System for Mobile communication (GSM), IEEE 802.16 standard (WiMAX), or an IEEE 802.11 standard (Wi-Fi).

According to one or more implementations, the remote server 115 can be coupled to the wireless services provider 140 via one or more communications connections 160, which can include wired electrical links (e.g., a T1 or T3 line), wireless links, optical links, or other modes of communicative coupling. The wireless services provider 140 can provide cellular telephony or other digital communications services to users of electronic devices, such as the mobile device 105 and the other mobile devices 110. For example, the wireless services provider 140 can be a cellular telephone service provider (such as Sprint Nextel Corporation), a personal communications services (PCS) provider, or a provider of other wireless services. The wireless services provider 140 can include one or more wireless servers 155 and a network of base stations 150. The mobile device 105 and the other mobile devices 110 can communicate via the base stations 150 with the wireless servers 155 of the wireless services provider 140 using a multi-tiered (e.g., client-server) software architecture over the wireless connection 135. Thus, the mobile device 105 and the other mobile devices 110 can communicate with the remote server 115 via the wireless services provider 140, and the remote server 115 can deliver relevant information content, such as location information, to the mobile device 105 via the wireless services provider 140.

According to one or more implementations, the mobile device 105 can be configured to transmit the location request 135, including the identification information, for example the self-configuring network identifiers, to the remote server 115 in any conventional format or protocol compatible with the remote server 115 and the wireless connection 145. The location request 135 can be communicated to the remote server 115 via a communication protocol such as, for example, electronic mail (e-mail), multimedia messaging service (MMS), enhanced messaging service (EMS), short messaging service (SMS), WAP push, application push (e.g., a push registry), a standard form of telephony, or standard internet protocols such as Transmission Control Protocol (TCP), IP, User Datagram Protocol (UDP), hypertext transfer protocol (HTTP), and File Transfer Protocol (FTP).

According to one or more implementations, the remote server 115 can be configured to determine a location for the mobile device 105 based on location request 135, including the identification information of the other mobile devices 110 within proximity of the mobile device 105, and configured to provide the determined location to the mobile device 105. The remote server 115 can include one or more servers 165 and 170 and a repository 175, which can be coupled by connections 180 across one or more communications networks, such as a local area network (LAN), an intranet, or the internet. For example, the remote server 115 can include one or more of messaging servers 165 to handle communications with the wireless services provider 140 and/or the mobile device 105 to receive the location request 135 and to deliver, or provide access to, the location of the mobile device 105.

According to one or more implementations, the remote server 115 can be configured to include a location services server 170. The location services server 170 can be configured to receive the location request 135 and configured to determine the location of the mobile device 105. In one implementation, the messaging server 165, the location services server 170, and the repository 175 can reside at different physical locations and be communicatively coupled via the connections 180. For example, the messaging server 165 can be physically resident at a location managed by a cellular telephone company that also manages the wireless services provider 140. The location services server 170 and the repository 175 can physically reside at a different location, provider, or source. One skilled in the art will realize that the messaging server 165, the location services server 170, and the repository 175 can reside at any location. Likewise, any of the wireless servers 155, the messaging server 165, the location services server 170, and the repository 175 can be implemented in a single server.

According to one or more implementations, the location services server 170 can be configured to receive the location request 135 via the wireless services provider 140 and messaging server 165. The location services server 170 can be configured to determine the location of the mobile device 105 based on the identification information of the other mobile devices 110 within proximity of the mobile device 105. The location services server 170 can be configured to maintain, in repository 175, a location record 185. The location record 185 can be configured to include the identification information of the other mobile devices 110 associated with the location information for the other mobile devices 110 that include location fixing resources.

According to one or more implementations, once the location request 135 is received, the location services server 170 can be configured to examine the location request 135 to identify the identification information, for example the network device identifiers, of the other mobile devices 110 within proximity of the mobile device 105. Once identified, the location services server 170 can be configured to search the location record 185 for location information associated with one or more of the other mobile devices 110 within proximity of the mobile device 105 and can be configured to retrieve any available location information from the location record 185.

According to one or more implementations, the location services server 170 can be configured to determine a location for mobile device 105 based on the retrieved location information of one or more of the other mobile devices 110, which include location fixing resources. The location services server 170 can be configured to determine the location utilizing any number of processes and algorithms depending on the number of other mobile devices 110 for which location information was retrieved. For example, if the location services server 170 identifies location information for only one other mobile device 110, the location services server 170 can be configured to determine the location of the mobile device 105 to be the location of the other mobile device 110 within proximity of the mobile device 105.

According to one or more implementations, if the location services server 170 identifies location information for more than one other mobile devices 110 within proximity of the mobile device 105, the location services server 170 can be configured to determine the location of the mobile device 105 by selecting the retrieved location information of one of other mobile devices 110 or combine the location information to determine the location of the mobile device 105. For example, the location services server 170 can be configured to average the retrieved location information to determine the location of the mobile device 105, select the retrieved location information most recently received from one of the other mobile devices 110 to determine the location of mobile device 105, and/or randomly select the received location information associated with one of the other mobile devices 110 to determine the location of the mobile device 105. One skilled in the art will realize that the location services server 170 can utilize any process or algorithm to determine the location of the mobile device 105 based on the retrieved location information.

According to one or more implementations, once the location of the mobile device 105 is determined, the remote server 115 can be configured to provide the determined location to the mobile device 105. The remote server 115 can be configured to communicate a location reply 190, including the determined location, to the mobile device 105 via the wireless service provider 140. The location reply 190 can be communicated to the mobile device 105 via a communication protocol such as, for example, electronic mail (e-mail), multimedia messaging service (MMS), enhanced messaging service (EMS), short messaging service (SMS), WAP push, application push (e.g., a push registry), a standard form of telephony, or standard internet protocols such as Transmission Control Protocol (TCP), IP, User Datagram Protocol (UDP), hypertext transfer protocol (HTTP), and File Transfer Protocol (FTP).

According to one or more implementations, in order to provide the location services, the remote server 115 can be configured to acquire the location information from the other mobile devices 110, which have location fixing hardware. The remote server 115 can be configured to query the other mobile devices 110 for the location information. Likewise, one or more of other mobile devices 110 can be configured to provide the location information to remote server. In either case, the location information from one or more of other mobile devices 110 can be communicated to remote server 115 via the wireless service provider 140 over the wireless connection 145. The location information can be communicated to remote server 115 via a communication protocol such as, for example, electronic mail (e-mail), multimedia messaging service (MMS), enhanced messaging service (EMS), short messaging service (SMS), WAP push, application push (e.g., a push registry), a standard form of telephony, or standard internet protocols such as Transmission Control Protocol (TCP), IP, User Datagram Protocol (UDP), hypertext transfer protocol (HTTP), and File Transfer Protocol (FTP).

According to one or more implementations, once the location information is received, the remote server 115 can be configured to store the received location information in the location record 185. The remote server 115 can be configured to acquire the location information periodically or upon the occurrence on any number of events.

Figure 2:
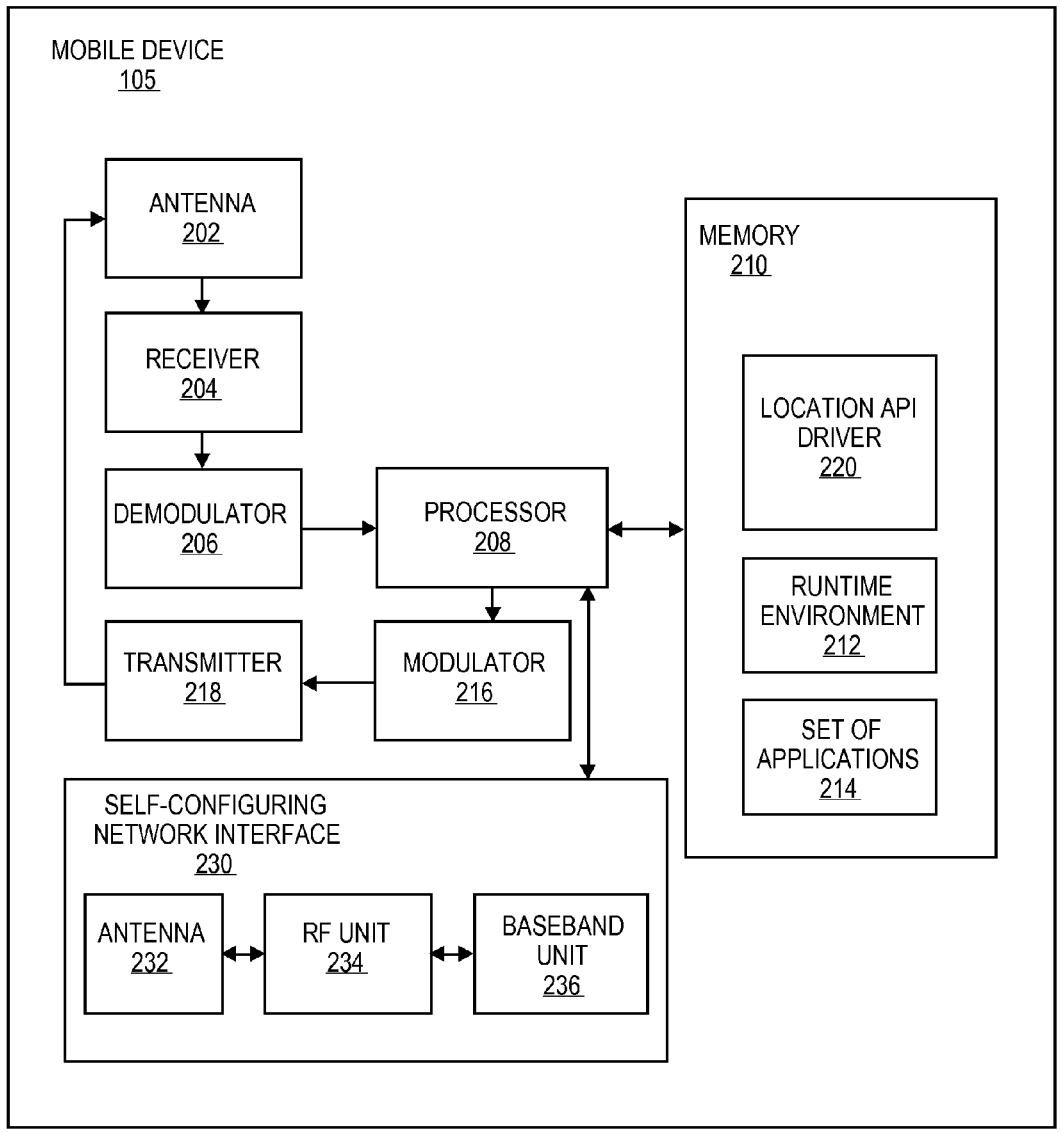
FIG. 2 illustrates an exemplary configuration of a mobile device configured to determine a location absent location fixing hardware, according to one or more implementations of the present teachings.

Reference will now be made to FIG. 2 to illustrate an exemplary configuration of the mobile device 105, consistent with one or more implementations of the present teachings. The mobile device 105 (as shown in FIG. 1) can include at least one antenna 202 (e.g., a transmission receiver or group of such receivers comprising an input interface) that receives a signal (e.g., pertaining to a mobile call initiation or other handshake, a handshake response, a mobile application data transfer, a data event, data event response, handshake termination, etc.) and a receiver 204, which performs actions (e.g., filters, amplifies, down-converts, and the like) on the received signal. The antenna 202 can, for example, transmit or receive a response to a handshake request, data event request, or the like. The antenna 202 and receiver 204 can also be coupled with a demodulator 206 that can demodulate received signals and provide them to a processor 208 for processing. The processor 208 can analyze information received by the antenna 202 and/or a user input interface (not depicted) of the mobile device 105, and/or generate information for transmission by a transmitter 218 via a modulator 216. The processor 208 can utilize the antenna 202, receiver 204, transmitter 218, and modulator 216 to communicate with the wireless services provider 140 over the wireless connection 145.

In one or more implementations, the mobile device 105 can additionally include a memory 210, which includes one or more computer-readable storage media, that is operatively coupled to the processor 208 and that can store instructions to be executed and data to be transmitted, received, processed, and the like. The mobile device 105 can include the memory 210 to store computer-readable data (e.g., location of device 105, and the like) and computer-executable software instructions (e.g., a location API driver 220, runtime environment 212, set of applications 214, and the like). The memory 210 can include one or more of a solid state memory (e.g., read-only memory, random access memory, flash memory, and the like), a magnetic hard drive, an optically-readable medium such as a compact disc (CD) or digital video disc (DVD), and the like.

In implementations, the mobile device 105 can utilize the processor 208 to execute software instructions stored in the memory 210. For example, the processor 208 can execute the runtime environment 212, such as BREW® from Qualcomm Incorporated, Java ME™ from Sun Microsystems, Symbian™ OS from Symbian Ltd., Flash Lite™ from Adobe Systems, Windows Mobile™ from Microsoft Corporation, iPhone™ OS from Apple Inc., Android™ from Open Handset Alliance, or the like, as well as the set of applications 214 or other software, modules, applications, logic, code, or the like.

In one or more implementations, the location API driver 220 can be configured to provide the functionality of the location services as described above and below. The location API driver 220 can be configured to include the necessary logic, commands, and instructions to communicate with the processor 208 and a self-configuring network interface 230 in order to identify the other mobile devices 110 within proximity of the mobile device 105. Likewise, once identified, the location API driver 220 can be configured to include the necessary logic, commands, and instruction to communicate with the remote server 115 utilizing the processor 208, modulator 216, demodulator 206, transmitter 218, receiver 204, and antenna 202 in order to acquire the location of the mobile device 105.

In one or more implementations, the location API driver 220 can be implemented as an application program or driver capable of being stored in the memory 210 and executed by the processor 208. For example, the location API driver 220 can be implemented as a stand-alone application program that allows a user of the mobile device 105 to request the location of the mobile device 105. As such, the location API driver 220 can generate graphical user interfaces (GUIs) that allow the user to interact with the location API driver 105. Likewise, the location API driver 220 can be implemented as a device or software driver capable of being accessed by the set of applications 214. As such, when requiring the location of the mobile device 105, the set of applications 214 can communicate with the location API driver 220 in order to initiate the process of determining the location of the mobile device 105. The location API driver 220 can be written in any type of programming language compatible with the mobile device 105.

In one or more implementations, the mobile device 105 can be configured to include a self-configuring network interface 230. The self-configuring network interface 230 can be configured to allow the mobile device 105 to communicate with other devices, such as other mobile devices 110, over a self-configuring network. As illustrated, the self-configuring network interface 230 can include an antenna 232, a radio frequency ("RF") unit 234, and a baseband unit 236. In implementations, each of antenna 232, RF unit 234, and baseband unit 236 can communicate and transmit signals and data with each other via any data communication systems and protocols.

The baseband unit 236 can be configured to receive transmission data from processor 208, such as a request for the identification of other mobile devices 110. The baseband unit 236 can convert the transmission data received from processor 208 into a baseband signal that can be sent to the RF unit 234. Upon receipt, the RF unit 234 can convert the baseband signal into RF transmission data, such as that used in Bluetooth® radio communications, according to a set oscillation frequency. The RF unit 234 can send the RF transmission data to the antenna 232, and the antenna 232 can transmit the RF transmission data to the intended recipient, such as one or more of the other mobile devices 110.

One or more of the other mobile devices 110 can receive the RF transmission data, such as in the form of a request for identification information. One or more the other mobile devices 110 can retrieve individual identification information, for example network interface identifiers, and send the identification information to the mobile device 105 to be received by the antenna 232. The antenna 232 can transmit the received identification information to the RF unit 234. Upon receipt, the RF unit 234 can down-convert the identification information into a baseband signal according to the set oscillation frequency. The RF unit 234 can further output the baseband signal to the baseband unit 236, and the baseband unit 236 can convert the baseband signal into a signal for use by the mobile device 105. The baseband unit 236 can send the signal to the processor 208 for processing according to one or more implementations described herein.

In one or more implementations, for example, the self-configuring network interface 230 can be a Bluetooth® network interface that is capable of communicating with other devices via a Bluetooth® network. In this example, the baseband unit 236, RF unit 234, and antenna 232 can be configured to receive signals from the processor 208, convert the signals into Bluetooth® radio signals, and transmits the Bluetooth® radio signals to other devices which include a Bluetooth® network interface. In this example, in order to identify other mobile devices 110 within proximity of the mobile device 105, the location API driver 220 can instruct the self-configuring network interface 230 to perform an inquiry procedure to identify the other mobile devices within proximity of the mobile device 105 and including a Bluetooth® network interface. The self-configuring network interface 230 can transmit a Bluetooth® inquiry request to the other mobile devices 110 and can receive the unique Bluetooth® device identifier from the other mobile device 110 which contain a Bluetooth® network interface.

In one or more implementations, once the identification information of the other mobile devices 110 is received, the location API driver 220 can be configured to generate the location request 135 for transmission to the remote server 115. The location API driver 220 can pass the location request 135 to the processor for transmission over the wireless connection 145 utilizing the modulator 216, the transmitter 218, and the antenna 202. Likewise, the location API driver 220 can be configured to receive the location reply 190 from the remote server 115 and perform any other processing to provide the location to the user and/or the set of application 214.

Figure 3:
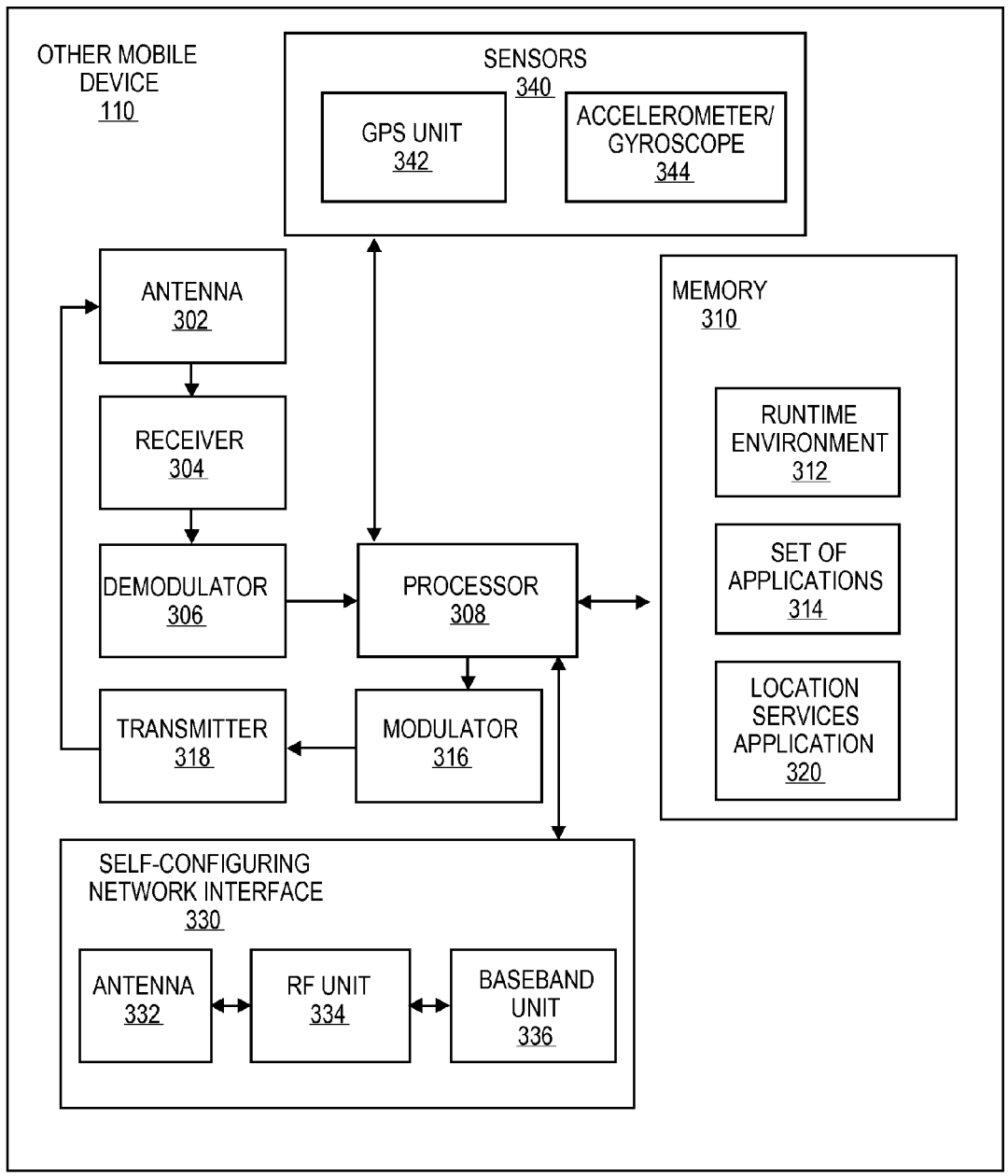
FIG. 3 illustrates an exemplary configuration of other mobile devices which can provide location information to a remote server, consistent with one or more implementations of the present teachings.

Reference will now be made to FIG. 3 to illustrate an exemplary configuration of one of other mobile devices 110, consistent with one or more implementations of the present teachings. One of other mobile devices 110 (as shown in FIG. 1) can include at least one antenna 302 (e.g., a transmission receiver or group of such receivers comprising an input interface) that receives a signal (e.g., pertaining to a mobile call initiation or other handshake, a handshake response, a mobile application data transfer, a data event, data event response, handshake termination, etc.) and a receiver 304, which performs actions (e.g., filters, amplifies, down-converts, and the like) on the received signal. The antenna 302 can for example transmit or receive a response to a handshake request, data event request, or the like. The antenna 302 and receiver 304 can also be coupled with a demodulator 306 that can demodulate received signals and provide them to a processor 308 for processing. The processor 308 can analyze information received by the antenna 302 and/or a user input interface (not depicted) of one of other mobile devices 110, and/or generate information for transmission by a transmitter 318 via a modulator 316. The processor 308 can utilize the antenna 302, receiver 304, transmitter 318, and modulator 318 to communicate with wireless services provider 140 over wireless connection 145.

In one or more implementations, one of other mobile devices 110 can additionally include a memory 310, which includes one or more computer-readable medium, that is operatively coupled to the processor 308 and that can store instructions to be executed and data to be transmitted, received, processed, and the like. One of other mobile devices 110 can include the memory 310 to store computer-readable data (e.g., location of device 110, and the like) and computer-executable software instructions (e.g., a runtime environment 312, a set of applications 314, a location services application 320, and the like). The memory 310 can comprise one or more of a solid state memory (e.g., read-only memory, random access memory, flash memory, and the like), a magnetic hard drive, an optically-readable medium such as a compact disc (CD) or digital video disc (DVD), and the like.

In one or more implementations, one of other mobile devices 110 can utilize the processor 308 to execute software instructions stored in memory 310. For example, the processor 308 can execute the runtime environment 312, such as BREW, Java ME™ from Sun Microsystems, Symbian™ OS from Symbian Ltd., Flash Lite™ from Adobe Systems, Windows Mobile™ from Microsoft Corporation, iPhone™ OS from Apple Inc., Android™ from Open Handset Alliance, or the like, as well as the set of applications 314 or other software, modules, applications, logic, code, or the like.

In one or more implementations, one of other mobile devices 110 can be configured to include a self-configuring network interface 330. The self-configuring network interface 330 can be configured to allow one of other mobile devices 110 to communicate with other devices, such as the mobile device 105, over a self-configuring network. As illustrated, the self-configuring network interface 330 can include an antenna 332, an RF unit 334, and a baseband unit 336. In one or more implementations, each of antenna 332, RF unit 334, and baseband unit 336 can communicate and transmit signals and data with each other via any data communication systems and protocols.

The antenna 332 can be configured to receive data, such as an identification request, from other components, such as mobile device 105, and transmit the received data to the RF unit 334. Upon receipt, the RF unit 334 can down-convert the received data into a baseband signal according to a set oscillation frequency. The RF unit 334 can further output the baseband signal to the baseband unit 336, and baseband unit 336 can convert the baseband signal into a digital signal. The baseband unit 336 can send the digital signal to processor 308, and processor 308 can perform steps to retrieve identification information, such as network device identifiers, according to one or more implementations described herein. Likewise, the self-configuring network interface 330 can locally store the network device identifiers of the self-configuring network interface 330 and retrieve the network device identifiers upon request.

The baseband unit 336 can be configured to receive data from the processor 308 (or locally retrieved), such as retrieved identification information of one of other mobile devices 110. The baseband unit 336 can convert the received data into a baseband signal that can be sent to the RF unit 334. Upon receipt, the RF unit 334 can convert the baseband signal into RF transmission data, such as that used in Bluetooth® radio communications, according to a set oscillation frequency. The RF unit 334 can send the RF transmission data to the antenna 332, and the antenna 332 can transmit the RF transmission data, such as the retrieved network device identifiers, to the intended recipient, such as the mobile device 105.

In one or more implementations, for example, the self-configuring network interface 330 can be a Bluetooth® network interface that is capable of communicating with other devices via a Bluetooth® network. In this example, the baseband unit 336, RF unit 334, and antenna 332 can be configured to receive signals from the processor 308, convert the signals into Bluetooth® radio signals, and transmits the Bluetooth® radio signals to other devices which include a Bluetooth® network interface. In this example, the self-configuring network interface 330 can receive a Bluetooth® inquiry request from the mobile device 105 and can transmit the unique Bluetooth® device identifier from the other mobile device 110 to the self-configuring network interface 230 of the mobile device 105.

According to one or more implementations, one of other mobile devices 110 can be configured to include one or more sensors 340. The one or more sensors 340 can be configured to detect the location, position, orientation, movement, and the like of one of the other mobile devices 110 by using, for example, a GPS unit 342 and an accelerometer/gyroscope 344. The GPS unit 342 can be configured to receive GPS data as known in the art, and the accelerometer/gyroscope 344 can be configured to collect movement data used in the calculation of location. The one or more sensors 340 can be configured to communicate any location-related data or calculations to processor 308 for processing or transmission in accordance with one or more implementations described herein.

In one or more implementations, the location services application 320 can be configured to provide the location information of the one of the other mobile devices 110 and the identification of the one of the other mobile devices 110 to the remote server 115 in order to implement the location services described herein. The location services application 320 can be configured to include the necessary logic, commands, and instructions to communicate with the sensors 340 to determine the location information of the one of the other mobile devices 110, to communicate with the self-configuring network interface 330, if necessary, to determine the identification information, and to provide the determined location information and identification information to the remote server 115 via the wireless connection 145. The location services application 320 can be implemented as an application program that is capable of being stored in the memory 310 and executed by the processor 308. The location services application 320 can be written in any type of programming language compatible with the one of the other mobile devices 110.

In one implementation, the location services application 320 can be configured to provide the location information and the identification information upon request from the remote server 115, periodically at its own initiation, or upon the occurrence of any number of events.

Figure 4:
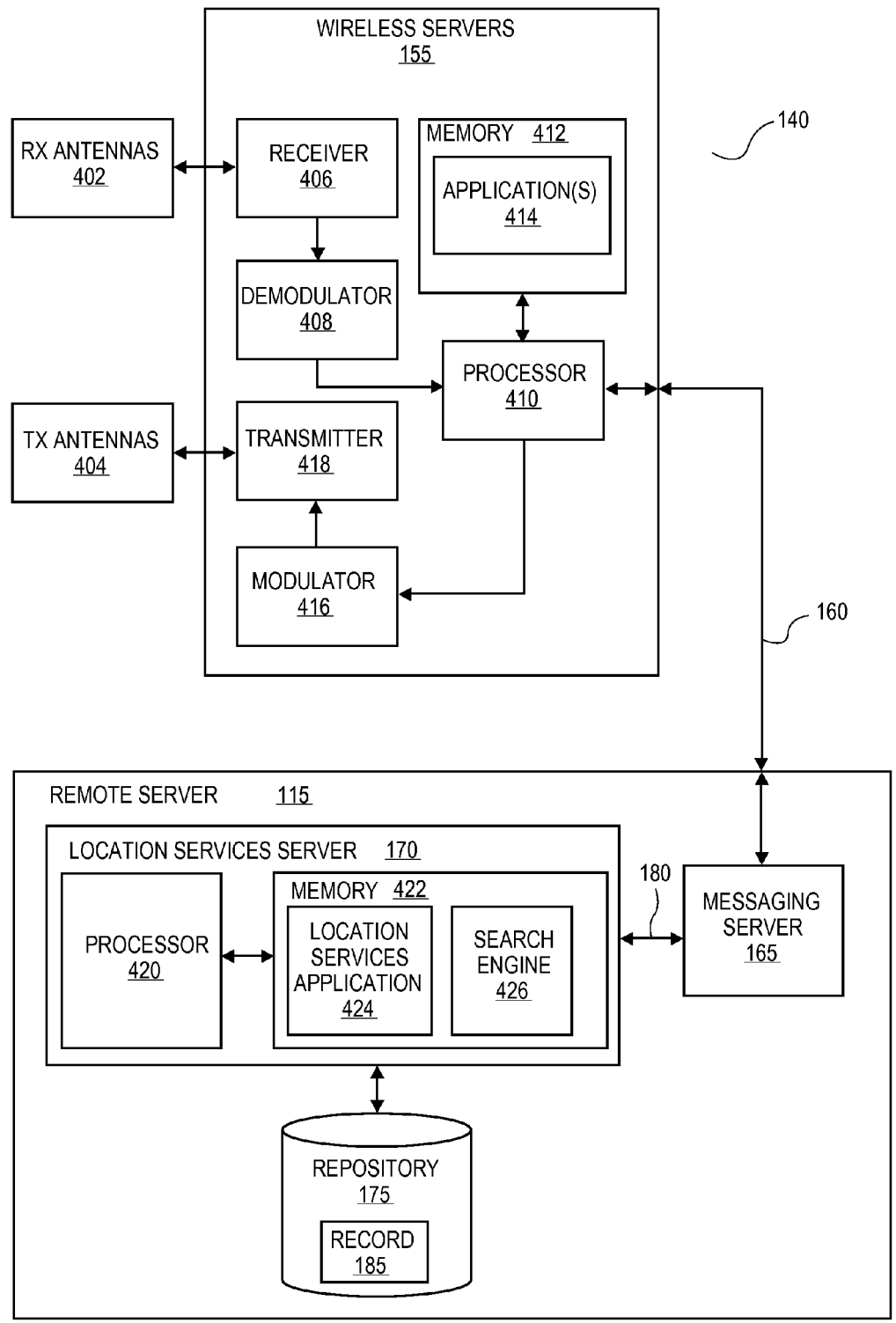
FIG. 4 illustrates an exemplary configuration a back-end of the location services system, consistent with one or more implementations of the present teachings.

Reference will now be made to FIG. 4 to illustrate an exemplary configuration of communication between the remote server 115 and the wireless server provider 140, including the wireless servers 155, consistent with one or more implementations of the present teachings. In one or more implementations, the wireless servers 155 can comprise a receiver 406 that receives one or more signals from one or more mobile devices (e.g., the mobile device 105 and the other mobile devices 110 as shown in FIG. 1) through the receive antennas 402, and a transmitter 418 that transmits one or more signals modulated by a modulator 416 to the mobile devices through the transmit antennas 404. The receiver 406 can receive information from the receive antennas 402 and can further include a signal recipient (not shown) that receives feedback data related to an un-received or indecipherable data packet. Additionally, the receiver 406 is operatively associated with a demodulator 408 that demodulates received information. A processor 410 can analyze demodulated symbols and information provided by the demodulator 408.

The processor 410 further couples to a memory 412 that can store one or more applications 414 that facilitate and/or participate in remote communication between the mobile devices, wireless servers 155, and/or remote server 115. For instance, the applications 414 can include a primary application configured to initiate a handshake and send data event requests (e.g., related to diagnostic information, data analysis, and so on) to a recipient application operating on the mobile devices. Alternatively, the applications 414 can include a secondary application that can receive a handshake request and authenticate an initiating application on the mobile devices. The applications 414 can further include rules for generating and/or verifying identifiers that identify applications 414 to a corresponding application on the mobile devices or vice versa, or an increment of such identifiers identifying a particular round-trip communication. Further, the rules can specify policies for re-transmitting un-acknowledged transmissions, re-initiating handshake requests and/or responses, and terminating a handshake, or the like. Consequently, the applications 414 can engage in mobile communication with one or more applications (e.g., set of applications 214, 314, the location API driver 220, and the location services application 320 as shown in FIGS. 2 and 3) resident upon the mobile devices, and/or any other suitable activity related to performing the various actions and functions set forth herein.

In one or more implementations, the remote server 115 can operate in conjunction with the mobile devices (e.g., mobile device 105 and other mobile devices 110) and the wireless servers 155 to enable the functional implementations as described herein. The remote server 115 can include messaging server 165 to handle communications with the mobile devices and/or the wireless servers 155 and to deliver, or provide access to, the information content to the mobile devices in response to the location request 135. For example, the messaging server 165 can receive the location request 135 and then transmit the location request 135 to the location services server 170. For another example, the messaging server 165 can receive a location, which can include information relevant to the location of the mobile device 105, generated by the location services server 170 in response to the location request 135, and then transmit the location reply 190 to the wireless servers 155 for transmission to the mobile device 105.

The messaging server 165 can further be configured to receive location information from the other mobile devices 110 through the servers 155. For example, the other mobile devices 110 can provide location information automatically or at an interval, or in response to a query from the remote server 115. The wireless servers 155 can receive the location information from the other mobile devices 110 and transmit the location information to the messaging server 165.

The remote server 115 can further include or communicate with the location services server 170 to store, index, and provide location information, such as, for example, identification and/or location information of mobile devices (e.g., mobile device 105 and other mobile devices 110), and other information. The location services server 170 can provide relevant location information in response to, for example, a location request 135 submitted by the mobile device 105 via the messaging server 165.

In one or more implementations, the location services server 170 can include a processor 420 and a memory 422, which can include one or more computer-readable medium that is operatively coupled to the processor 420 and can store instructions to be executed and data to be transmitted, received, processed, and the like. The memory 422 can comprise one or more of a solid state memory, a magnetic hard drive, an optically-readable medium such as a CD or DVD, and the like. The instructions stored therein are executed to configure the processor 420 to search for and provide relevant location information based on the location request 135, in conjunction with other components of system 100. For example, the memory 422 can store instructions for a search engine 426 and a location services application 424. The location services server 170 can further be coupled to the repository 175 that can store associated location record 185.

In one or more implementations, the location record 185 can store location and/or identification information of mobile devices (e.g., the other mobile devices 110). The location record 185 can be implemented as any type of searchable data structure that stores the identification information (e.g., network device identifiers) of the other mobile device 110 associated with the location information of the other mobile devices 110. The location services application 424 can be implemented as an application program capable of being stored in the memory 422 and executed by the processor 420. The location services application 424 can be configured to include the necessary logic, commands, and instructions to receive the location requests 135, determine a location for the mobile device 105, and provide the location reply 190 to the mobile device 105. The location services application 424 can be written in any type of programming language compatible with the location services server 170.

The search engine 426 can be configured to locate and retrieve relevant location information in response to the location request 135 from the mobile device 105. The search engine 426 can be implemented as an application program, whether separate or integrated in the location services application 424, capable of being stored in the memory 422 and executed by the processor 420. The search engine 426 can be configured to include the necessary logic, commands, and instructions to search the location records 185. The search engine can be written in any type of programming language compatible with the location services server 170.

In the implementation shown, for example, prior to receiving location queries, the location services server 170 can perform a crawl of repository 175 and associated location record 185, and/or other computer-readable data storage coupled to the location services server 170 to locate and index information content stored therein. Thus, the search engine 426 can locate relevant location information by accessing the index in response to the location request 135.

In one or more implementations, once the location request 135 is received, the location services application 424 can be configured to parse the location request 135 and determine the identification information of the other mobile devices 110 contained in the location request 135. The location services application 424 can be configured to pass the identification information of the other mobile devices 110 to the search engine 426. The search engine 426 can be configured to search the location record 185 to determine the location information associated with the identification of the other mobile devices 110 and retrieve any location information. The search engine 426 can be configured to return the location information to the location services application 424.

In one or more implementations, the location services application 424 can be configured to determine what location information to deliver to the mobile device 105 and/or how to deliver the information content, such as the form of the location information and the communication protocol, etc. The location services application 424 can be configured to determine a location for mobile device 105 based on the retrieved location information of one or more of the other mobile devices 110. The location services application 424 can be configured to determine the location utilizing any number of processes and algorithms depending on the number of other mobile devices 110 for which location information was retrieved. For example, if the location services application 424 identifies location information for only one other mobile device 110, the location services application 424 can be configured to determine the location of the mobile device 105 to be the location of the other mobile device 110 within proximity of the mobile device 105. If the location services application 424 identifies location information for more than one other mobile devices 110 within proximity of the mobile device 105, the location services application 424 can be configured to determine the location of the mobile device 105 by selecting the retrieved location information of one of other mobile devices 110 or combine the location information to determine the location of the mobile device 105. For example, the location services application 424 can be configured to average the retrieved location information to determine the location of the mobile device 105, select the retrieved location information most recently received from one of the other mobile devices 110 to determine the location of mobile device 105, and/or randomly select the received location information associated with one of the other mobile devices 110 to determine the location of the mobile device 105. One skilled in the art will realize that the location services application 424 can utilize any process or algorithm to determine the location of the mobile device 105 based on the retrieved location information.

In one or more implementations, the location services application 424 can be configured to acquire the location information from the other mobile devices 110 and to store the location information in the location record 185. As such, the location services application 424 can be configured to include the necessary logic, commands, and instructions to communicate with the location services application 320 of one or more of the other mobile devices 110 in order to acquire the location information and identification information of the other mobile devices 110 and to store the acquired location information and identification information in the location record 185.

Figure 5A:
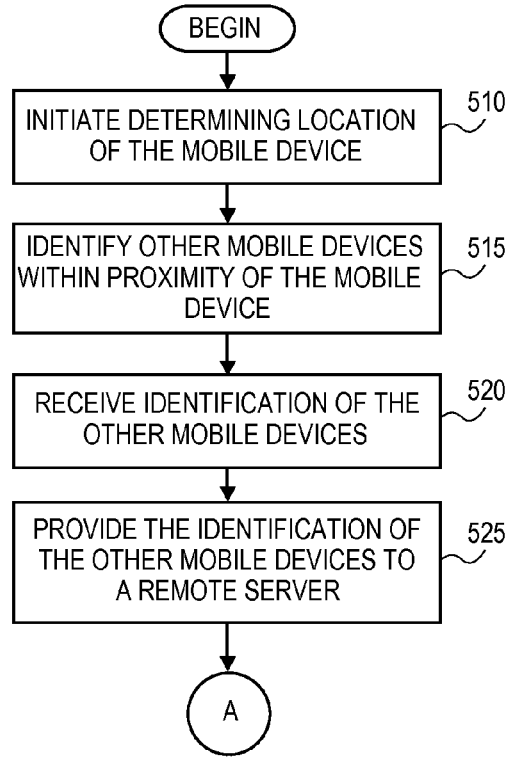
FIGS. 5A-C illustrate flowcharts of processing performed by a mobile device to communicate with a remote server to determine the location of the mobile device, according to one implementation of the present teachings.
Figure 5B:
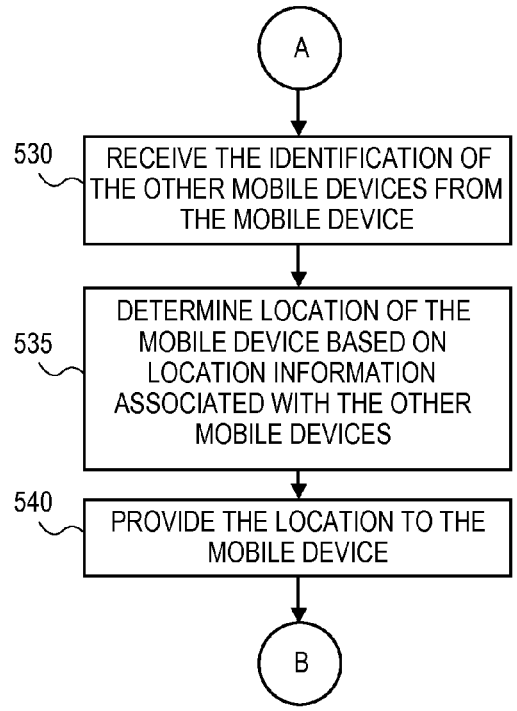
Figure 5C:
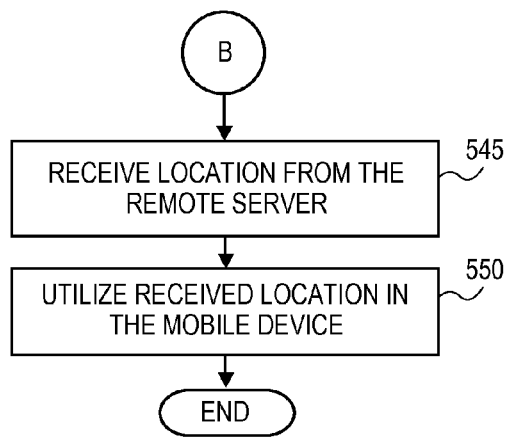

FIGS. 5A-C illustrate flowcharts of processing that can be performed by mobile device 105 (as shown in FIGS. 1 and 2) to request location services from remote server 115 (as shown in FIGS. 1 and 4), according to one or more implementations of the present teachings. As illustrated in FIG. 5A, in 510, the mobile device 105 can initiate a determining of a location for mobile device 105. The mobile device 105 can initiate the determination upon the occurrence of any number of events. For example, one or more of set of applications 214 can require the location of the mobile device 105 and can utilize location API driver 220 to determine the location. Additionally, the user of the mobile device 105 can desire to know the location of the mobile device 105 and utilize location API driver 220 to determine the location.

Next, in 515, the mobile device 105 can identify other mobile devices 110 within proximity of the mobile device 105. For example, the mobile device 105 and one or more of other mobile devices 110 can be configured to communicate via a self-configuring network interface, such as a Bluetooth® network interface. The mobile device 105 can be configured to broadcast inquiry request 120 to any other mobile devices 110 within range 125 of the self-configuring network signal. The inquiry request 120 can be configured to request or initiate a response from other mobile devices 110, such as a Bluetooth® inquiry request.

In 520, the mobile device 105 can receive identification of other mobile devices 110. For example, the other mobile devices 110, which contain a self-configuring network interface, can be configured to transmit a response 130 to the inquiry request 120. The response 130 can be configured to include information that identifies other mobile devices 110. For example, each of other mobile devices 110, which contain the self-configuring network interface, can respond with the network device identifiers, such as a Bluetooth® device identifier, of its particular self-configuring network interface. In 525, the mobile device 105 can provide the identification information of other mobile devices 110 to the remote server 115. For example, the mobile device 105 can communicate with the remote server 115 via the wireless services provider 140.

As illustrated in FIG. 5B, in 530, the remote server 115 can receive the identification information of the other mobile devices 110 from the mobile device 105. For example, remote server 115 can include the messaging server 165 to handle communications with the wireless services provider 140 and/or the mobile device 105 to receive location request 135.

In 535, the remote server 115 can determine the location of the mobile device 105 based on location information associated with the other mobile devices 110. For example, the location services server 170 of the remote server 115 can be configured to search the location record 185 in the repository 175 for location information associated with the other mobile devices 110 within proximity of the mobile device 105, and can be configured to retrieve any available location information from the location record 185. Further, the location services server 170 can determine location of the mobile device 105 according to process or algorithms described in implementations contained herein.

In 540, the remote server 115 can provide the location to the mobile device 105. For example, the remote server 115 can be configured to communicate the location reply 190, including the determined location, to the mobile device 105 via the wireless service provider 140.

As illustrated in FIG. 5C, in 545, the mobile device 105 can receive location from the remote server 115. For example, the mobile device 105 can receive the location replay 190 from the remote server 115 via the wireless service provider 140. In 550, the mobile device 105 can utilize the received location. For example, one of set of applications 214 in the mobile device 105 can utilize the received location in conjunction with a functionality of one of set of applications 214, according to implementations described herein.

Figure 6:
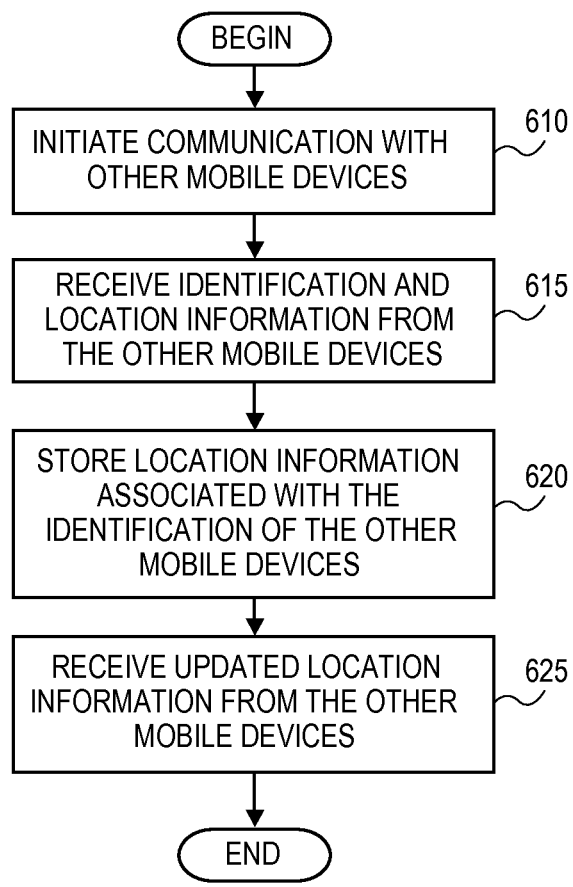
FIG. 6 illustrates a flowchart of processing performed by a remote server to determine the location information of other mobile devices, according to one implementation of the present teachings

FIG. 6 illustrates a flowchart of processing that can be performed by the remote server 115 (as shown in FIGS. 1 and 4) in response to a location and/or identification functionality of the other mobile devices 110 (as shown in FIGS. 1 and 3), according to one or more implementations of the present teachings. In 610, the remote server 115 can initiate communication with the other mobile devices 110. The remote server 115 can initiate the communication upon the occurrence of any number of events. For example, the remote server 115 can periodically or continuously poll one or more of the other mobile devices 110 for location and/or identification information via the wireless service provider 140. Additionally, one or more of other mobile devices 110 can periodically or continuously push location and/or identification information to the remote server 115 via the wireless service provider 140.

In 615, the remote server 115 can receive identification and/or location information from one or more of the other mobile devices 110. For example, in response to the initiated communication, one or more of the other mobile devices 110 can send identification and/or location information to the location services server 170 of the remote server 115 via the wireless service provider 140. In 620, the remote server 115 can store location information associated with the identification of the other mobile devices 110. For example, the location services server 170 can be configured to maintain, in the repository 175, the location record 185 received from the other mobile devices 110. The location record 185 can comprise received location data associated with the identification information of the other mobile devices 110. In 625, the remote server 115 can receive updated location information from the other mobile devices 110. For example, as a result of the periodic, manual, and/or automatic communication with the other mobile devices 110, the location services server 170 can receive information corresponding to updated location information of the other mobile devices 110 and store the updated location information based on identification information in the location record 185 of the repository 175.

When the implementations described herein are implemented in software, firmware, middleware, microcode, and/or program code or code segments, they can be stored in a computer-readable storage medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described may be implemented in hardware, software, firmware, or any combination thereof. For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art. If implemented in software, the functions may be stored on or transmitted over as one or more instructions or code on a computer-readable medium. Computer-readable media includes both tangible computer storage media and communication media including any medium that facilitates transfer of a computer program from one place to another. A storage media may be any available tangible media that can be accessed by a computer. By way of example, and not limitation, such tangible computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and blu-ray disc where disks usually reproduce data magnetically, while discs reproduce data optically with lasers. Combinations of the above should also be included within the scope of computer-readable media.

The steps of a method or algorithm described in connection with the implementations disclosed herein may be embodied directly in hardware, in a software module executed by a processor, or in a combination of the two. Although the method has been described by examples, the steps of the method may be performed in a different order than illustrated or simultaneously. A software module may reside in RAM memory, flash memory, ROM, EPROM, EEPROM, registers, a hard disk, a removable disk, a CD-ROM, or any other form of computer-readable storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a mobile device. In the alternative, the processor and the storage medium may reside as discrete components in a mobile device. Other resources described as singular or integrated can in implementations be plural or distributed, and resources described as multiple or distributed can in implementations be combined. The scope of the present teachings is accordingly intended to be limited only by the following claims.

What is claimed is:

1. A system for enabling location services, comprising:
a server configured to:
receive location information from each of a set of mobile devices, wherein each of the set of mobile devices sends the location information to the server over a wireless interface;
maintain a record of the location information for each of the set of mobile devices, wherein the location information for each mobile device is associated with an identification of each mobile device;
receive a request for a location from a mobile device, the request including identifications for other mobile devices of the set of mobile devices within a range of a self-configuring network interface of the mobile device;
determine the location of the mobile device utilizing available location information, from the record, associated with the received set of identifications; and
provide the determined location to the mobile device.

2. The system of claim 1, wherein the server is further configured to:
store, in the record, the location information of each mobile device associated with the identification of each mobile device and a time the location information was received.

3. The system of claim 2, wherein the location information from each of the set of mobile devices is received periodically.

4. The system of claim 1, wherein determining the location comprises one of averaging the available location information to determine the location, selecting the available location information most recently received associated with one mobile device in the set of mobile devices as the determined location, or randomly selecting the available location information associated with one mobile device in the set of mobile devices as the determined location.

5. The system of claim 1, wherein the identification comprises a self-configuring network device identifier.

6. The system of claim 1, wherein the location information comprises one of a Global Positioning System (GPS) location fix, an Assisted Global Positioning System (A-GPS) location fix, a Galileo system location fix, or a tower Trilateration fix.

7. A method for enabling location services, comprising:
receiving, at a server, location information from each of a set of mobile devices, wherein each of the set of mobile devices sends the location information to the server over a wireless interface;
maintaining, at the server, a record of the location information for each of the set of mobile devices, wherein the location information for each mobile device is associated with an identification of each mobile device;
receiving, at the server, a request for a location from a mobile device, the request including identifications for other mobile devices of the set of mobile devices within a range of a self-configuring network interface of the mobile device;
determining, at the server, the location of the mobile device utilizing available location information, from the record, associated with the received set of identifications; and
providing, by the server, the determined location to the mobile device.

8. The method of claim 7, the method further comprising:
storing, in the record, the location information of each mobile device associated with the identification of each mobile device and a time the location information was received.

9. The method of claim 8, wherein the location information from each of the set of mobile devices is received periodically.

10. The method of claim 7, wherein determining the location comprises one of averaging the available location information to determine the location, selecting the available location information most recently received associated with one mobile device in the set of mobile devices as the determined location, or randomly selecting the available location information associated with one mobile device in the set of mobile devices as the determined location.

11. The method of claim 7, wherein the identification comprises a self-configuring network device identifier.

12. The method of claim 7, wherein the location information comprises one of a Global Positioning System (GPS) location fix, an Assisted Global Positioning System (A-GPS) location fix, a Galileo system location fix, or a tower Trilateration fix.

13. A system for enabling location services, comprising:
means for receiving location information from each of a set of mobile devices, wherein each of the set of mobile devices sends the location information to the system over a wireless interface;
means for maintaining a record of the location information for each of the set of mobile devices, wherein the location information for each mobile device is associated with an identification of each mobile device;
means for receiving a request for a location from a mobile device and providing the location to the mobile device, the request including identifications for other mobile devices of the set of mobile devices within a range of a self-configuring network interface of the mobile device; and
means for determining the location of the mobile device utilizing available location information, from the record, associated with the received set of identifications; and
means for providing the determined location to the mobile device.

14. The system of claim 13, wherein the means for maintaining the record is further configured to store, in the record, the location information of each mobile device associated with the identification of each mobile device and a time the location information was received.

15. The system of claim 14, wherein the location information from each of the set of mobile devices is received periodically.

16. The system of claim 13, wherein determining the location comprises one of averaging the available location information to determine the location, selecting the available location information most recently received associated with one mobile device in the set of mobile devices as the determined location, or randomly selecting the available location information associated with one mobile device in the set of mobile devices as the determined location.

17. The system of claim 13, wherein the identification comprises a self-configuring network device identifier.

18. The system of claim 13, wherein the location information comprises one of a Global Positioning System (GPS) location fix, an Assisted Global Positioning System (A-GPS) location fix, a Galileo system location fix, or a tower Trilateration fix.

19. A non-transitory computer-readable medium storing instructions that causes a computer to perform location services when executed by the computer, comprising:
   at least one instruction for causing the computer to receive location information from each of a set of mobile devices, wherein each of the set of mobile devices sends the location information to the computer over a wireless interface;
   at least one instruction for causing the computer to maintain a record of the location information for each of the set of mobile devices, wherein the location information for each mobile device is associated with an identification of each mobile device;
   at least one instruction for causing the computer to receive a request for a location from a mobile device, the request including identifications for other mobile devices of the set of mobile devices within a range of a self-configuring network interface of the mobile device;
   at least one instruction for causing the computer to determine the location of the mobile device utilizing available location information, from the record, associated with the received set of identifications; and
   at least one instruction for causing the computer to provide the determined location to the mobile device.

20. The non-transitory computer-readable medium of claim 19, further comprising:
   at least one instruction for causing the computer to store, in the record, the location information of each mobile device associated with the identification of each mobile device and a time the location information was received.

21. The non-transitory computer-readable medium of claim 20, wherein the location information from each of the set of mobile devices is received periodically.

22. The non-transitory computer-readable medium of claim 19, wherein the at least one instruction for causing the computer to determine the location comprises one of at least one instruction for causing the computer to average the available location information to determine the location, at least one instruction for causing the computer to select the available location information most recently received associated with one mobile device in the set of mobile devices as the determined location, or at least one instruction for causing the computer to randomly select the available location information associated with one mobile device in the set of mobile devices as the determined location.

23. The non-transitory computer-readable medium of claim 19, wherein the identification comprises a self-configuring network device identifier.

24. The non-transitory computer-readable medium of claim 19, wherein the location information comprises one of a Global Positioning System (GPS) location fix, an Assisted Global Positioning System (A-GPS) location fix, a Galileo system location fix, or a tower Trilateration fix.

25. A mobile device, comprising:
   a wireless interface to a server;
   a self-configuring wireless network interface; and
   a processor, communicating with the wireless interface and the self-configuring wireless network interface, the processor being configured to initiate processing comprising:
      identifying, via the self-configuring wireless network interface, a set of other mobile devices within a range of the self-configuring wireless network interface of the mobile device;
      requesting, from the server via the wireless interface, a location of the mobile device based on identifications of the set of other mobile devices, wherein the server receives location information from the set of other mobile devices over one or more wireless interfaces; and
      receiving, from the server via the wireless interface, the location of the mobile device.

26. The mobile device of claim 25, wherein identifying the set of other mobile devices, comprises:
   broadcasting, via the self-configuring wireless network interface, an inquiry request to the set of other mobile devices within a range of the self-configuring wireless network interface of the mobile device; and
   receiving, via the self-configuring wireless network interface, a response from the set of other mobile devices, wherein the response includes the identifications of the set of other mobile devices.

27. The mobile device of claim 26, wherein the identifications comprise self-configuring network device identifiers.

28. The mobile device of claim 25, the processor being further configured to initiate processing comprising—
   providing the location to a component of the mobile device requesting the location.

29. The mobile device of claim 25, further comprising:
   a memory, communicating with the processor, for storing the location.

30. The mobile device of claim 25, wherein the location is based on at least one of one of a Global Positioning System (GPS) location fix of the set of other mobile devices, an Assisted Global Positioning System (A-GPS) location fix of the set of other mobile devices, a Galileo system location fix, or a tower Trilateration fix of the set of other mobile devices.

31. A method of determining location in a mobile device independent of location fixing hardware, comprising:
   identifying, by the mobile device, a set of other mobile devices within a range of a self-configuring network interface of the mobile device;
   requesting, by the mobile device, from a server, a location of the mobile device based on identifications of the set of other mobile devices, wherein the server receives location information from the set of other mobile devices over one or more wireless interfaces; and
   receiving, by the mobile device, from the server, the location of the mobile device.

32. The method of claim 31, wherein identifying the set of other mobile devices, comprises:

broadcasting an inquiry request to the set of other mobile devices within a range of the self-configuring network interface of the mobile device; and receiving a response from the set of other mobile devices, wherein the response includes the identifications of the set of other mobile devices.

33. The method of claim 32, wherein the identifications comprise self-configuring network device identifiers.

34. The method of claim 31, the method further comprising:
providing the location to a component of the mobile device requesting the location.

35. The method of claim 31, the method further comprising:
storing the location in the mobile device.

36. The method of claim 31, wherein the location is based on at least one of one of a Global Positioning System (GPS) location fix of the set of other mobile devices, an Assisted Global Positioning System (A-GPS) location fix of the set of other mobile devices, a Galileo system location fix, or a tower Trilateration fix of the set of other mobile devices.

37. A system for determining location in a mobile device independent of location fixing hardware, comprising:
means for identifying a set of other mobile devices within a range of a self-configuring network interface of the mobile device;
means for requesting, from a server, a location of the mobile device based on identifications of the set of other mobile devices, wherein the server receives location information from the set of other mobile devices over one or more wireless interfaces; and
means for receiving, from the server, the location of the mobile device.

38. The system of claim 37, wherein the means for identifying the set of other mobile device is configured to:
broadcast an inquiry request to the set of other mobile devices within a range of the self-configuring network interface of the mobile device; and
receive a response from the set of other mobile devices, wherein the response includes the identifications of the set of other mobile devices.

39. The system of claim 38, wherein the identifications comprise self-configuring network device identifiers.

40. The system of claim 37, further comprising:
means for providing the location to a component of the mobile device requesting the location.

41. The system of claim 37, further comprising:
means for storing the location in the mobile device.

42. The system of claim 37, wherein the location is based on at least one of one of a Global Positioning System (GPS) location fix of the set of other mobile devices, an Assisted Global Positioning System (A-GPS) location fix of the set of other mobile devices, a Galileo system location fix, or a tower Trilateration fix of the set of other mobile devices.

43. A non-transitory computer-readable medium storing instructions that causes a mobile device to determine location independent of location fixing hardware when executed by the mobile device, comprising:
at least one instruction for causing the mobile device to identify a set of other mobile devices within a range of a self-configuring network interface of the mobile device;
at least one instruction for causing the mobile device to request, from a server, a location of the mobile device based on identifications of the set of other mobile devices, wherein the server receives location information from the set of other mobile devices over one or more wireless interfaces; and
at least one instruction for causing the mobile device to receive, from the server, the location of the mobile device.

44. The non-transitory computer-readable medium of claim 43, wherein the at least one instruction for causing the mobile device to identify the set of other mobile devices, comprises:
at least one instruction for causing the mobile device to broadcast an inquiry request to the set of other mobile devices within a range of the self-configuring network interface of the mobile device; and
at least one instruction for causing the mobile device to receive a response from the set of other mobile devices, wherein the response includes the identifications of the set of other mobile devices.

45. The non-transitory computer-readable medium of claim 44, wherein the identifications comprise self-configuring network device identifiers.

46. The non-transitory computer-readable medium of claim 43, further comprising:
at least one instruction for causing the mobile device to provide the location to a component of the mobile device requesting the location.

47. The non-transitory computer-readable medium of claim 43, further comprising:
at least one instruction for causing the mobile device to store the location in the mobile device.

48. The non-transitory computer-readable medium of claim 43, wherein the location is based on at least one of one of a Global Positioning System (GPS) location fix of the set of other mobile devices, an Assisted Global Positioning System (A-GPS) location fix of the set of other mobile devices, a Galileo system location fix, or a tower Trilateration fix of the set of other mobile devices.

49. The system of claim 1, wherein the server is further configured to:
receive the identification of each mobile device from the set of other mobile devices.

50. The system of claim 1, wherein the set of mobile devices comprises one or more of a cellular telephone, a personal digital assistant (PDA), a smart phone, a laptop computer, a tablet computer, a digital media device, or a GPS device.

* * * * *